Patented Sept. 7, 1937

2,091,966

UNITED STATES PATENT OFFICE 2,091,966

PRINTING INK

Edward M. Davidson, New York, N. Y., assignor, by mesne assignments, to Continental Can Company, Inc., a corporation of New York No Drawing. Application September 2, 1932, Serial No. 631,508

6 Claims. (Cl. 134—36)

This invention relates to printing inks and processes of making them and is herein disclosed as embodied in an ink especially adapted for printing upon cellophane and other films composed of or coated with a cellulose base, or paper, cloth and other fabrics, comprising or coated with a film comprising a cellulose base.

It has been found that ordinary printing inks often prove unsatisfactory when used for printing upon such material, especially upon films with a surface coating of cellulose nitrate or cellulose acetate. When ordinary printing inks are used upon such films, the ink dries very slowly, or often fails to dry, and thus offsets when sheets are piled one upon the other, necessitating the separation of each sheet as it comes from the press. Also, the ordinary inks when finally dried, easily scratch off, as they only imperfectly adhere on the surface of the sheet.

The present invention provides an ink which dries very quickly, by evaporation or absorption, or both, when used on such materials, the ink containing ingredients acting as a solvent when used upon many of the surfaces which are ordinarily found objectionable or difficult to print upon successfully with ordinary inks. Thus, when printing upon a surface of cellulose nitrate, certain material of the ink of the present invention softens or dissolves the surface, with the result that the color or pigment is absorbed by or carried into and impregnates the printed surface, which results in a rapid drying of the printing, a substantially permanent embodiment of the printing in and as a part of the material and enabling the sheets to be piled one upon the other as delivered from the press without separate handling or separation of the sheets.

It is also found that the ink of the present invention is self-dissolving and softens ink which may have dried or hardened upon the printing press rollers, thus eliminating the need of cleaning the rollers and other parts carrying the ink when a new run is started with the same kind of ink. Also, the ink distributes evenly and rapidly on the rollers, thus facilitating even printing.

The dried ink body of the ink of the present invention printed upon the material contains a cellulose ester, a resin, and a soap, together with the color or pigment and, usually, also, a plasticizer and a gum. To produce this ink, suitable solvents for these materials are employed as set forth in some detail hereinafter, in the illustrative examples.

One ink was made by dissolving 7 ounces of cellulose nitrate in a mixture of 15 ounces of amylacetate and 11 ounces of diacetone alcohol; 4 ounces of the resin gum copal was dissolved in 35 ounces of methyl alcohol; 9 ounces of commercial ester gum was dissolved in a mixture of 8 ounces of butyl alcohol and 2 ounces of butyl propionate. The three solutions were mixed together and with 16 ounces of a non-volatile plasticizer such as dibutyl phthalate and to the whole was added 15 ounces of commercial soft soap and mixed. Finally, there was added 30 ounces of carbon black previously mixed with 8 ounces of light powdered magnesium carbonate.

The resulting ink was found useful for printing upon cellophane, a viscous base film carrying an exceedingly thin surface coating of cellulose nitrate.

Another ink was made by dissolving 9 ounces of cellulose nitrate in 18 ounces of di-ethylene monobutyl ether and 4 ounces of nitrobenzene; 4 ounces of gum copal were separately dissolved in a mixture of 27 ounces of methyl alcohol and 6 ounces of amylacetate; 8½ ounces of ester gum were separately dissolved in a mixture of 22 ounces of butyl alcohol and 4 ounces of furfuryl alcohol. The three solutions were mixed together and with 16 ounces of a non-volatile plasticizer such as dibutyl tartrate. To the whole was added 15 ounces of a rosin soap and mixed. Finally, there was added 28 ounces of carbon black mixed with 5 ounces of light powdered magnesium carbonate.

The resulting ink was found useful in the same way as the first ink described.

A third ink was made by dissolving 10 ounces of cellulose nitrate in 14 ounces (fluid) of ethylene glycol monoethyl ether acetate; 4 ounces of copal were dissolved in 16 ounces of ethylene glycol monoethyl ether; 6 ounces of ester gum were separately dissolved in 37 ounces of furfural and added to the first mixture; 16 ounces of a non-volatile plasticizer such as tricresyl phosphate were then mixed with the latter mixture. To the whole was added 15 ounces of soft soap and mixed. Finally, there was added 30 ounces of carbon black mixed with 8 ounces of light powdered magnesium carbonate.

This third ink also proved useful for printing upon cellophane.

It has been found that a wide variety of other organic solvents are almost equally useful in preparing the ink, such as butyl acetate, ethyl acetate, ethyl alcohol, cyclohexanol acetate, acetone, ethylene glycol monobutyl ether, di-ethylene monomethyl ether, nitrobenzene, etc. These all make a rapid drying ink. It will be noted that the solution formed by the combined mixture of the solvents utilized in the above examples of inks incorporating the invention is highly volatile and has a boiling point of less than 120 deg. C., thus imparting to the ink the quick drying property at normal temperature without the application of additional heat.

It has been found that other resins or gums may be substituted for the copal, such as pontianak, sandarac, mastic, elemi, shellac, etc. The ester gum is the synthetic glyceride of the acids of common resin.

Other plasticizers may be substituted for the tricresyl phosphate, such as di-methyl phthalate, tricresyl phosphate, di-ethyl phthalate, di-ethyl carbonate, etc.

When it is desired to print in other colors than black, color ingredients or pigments of the desired color may be substituted for the carbon black, usually mixed with the body-forming light magnesium carbonate, sufficient being used to form a suitable thick ink paste for use on the press.

Cellulose nitrate has been given in the above examples as, at the present time, it appears to be the cheapest satisfactory cellulose derivative to use in the ink, but the special nitrate sold under the name of pyroxylin, or the acetate, or some other ester may be used if desired.

It will be understood that the three examples given for an ink and the method of preparing the same are intended as illustrative merely of the invention and not in a limiting sense.

What I claim is:—

1. A quick-drying printing ink adapted for use upon non-absorbent materials comprising cellulose nitrate dissolved in a mixture of amylacetate and diacetone alcohol, resin gum copal dissolved in methyl alcohol, ester gum dissolved in a mixture of butyl alcohol and butyl propionate, a non-volatile plasticizer, soft soap, coloring ingredient and magnesium carbonate.

2. A composition of matter in the form of a dried printing ink applied to the surface of the material printed upon and consisting of cellulose nitrate, copal, ester gum, a non-volatile plasticizer, a soap and a pigment.

3. A quick-drying printing ink adapted for use upon materials which are non-absorbent, consisting of seven parts of cellulose nitrate dissolved in a mixture of fifteen parts of amylacetate and eleven parts of diacetone alcohol, four parts of resin gum copal dissolved in thirty-five parts of methyl alcohol, nine parts of ester gum dissolved in a mixture of eight parts of butyl alcohol and two parts of butyl propionate, sixteen parts of a non-volatile plasticizer, fifteen parts of soft soap, thirty parts of a coloring ingredient and eight parts of magnesium carbonate.

4. A quick-drying printing ink adapted for printing upon surfaces of cellophane or like material, consisting of cellulose ester; a natural resin selected from the group consisting of copal, pontianak, sandarac, mastic, elemi and shellac; ester gum; a non-volatile plasticizer; a mixture of organic solvents for the aforesaid ingredients; soap; light-powdered magnesium carbonate as a bodying agent; and coloring material; said solvents forming a volatile combined solution constituting with the other ingredients a rapid-drying thick paste useful as a printing ink, said solvents being present in proportion and quantity capable of effecting at least a partial solution of cellophane or like material.

5. A quick-drying printing ink adapted for printing upon surfaces of cellophane or like material, comprising 7 to 10 parts by weight of cellulose nitrate, substantially 4 parts of copal resin, 6 to 9 parts of ester gum, about 16 parts of a non-volatile plasticizer for the cellulose nitrate, resin and gum; about 5 to 8 parts of magnesium carbonate as a bodying agent; soap; and pigment; in an organic solvent mixture for the cellulose nitrate, resin, gum and plasticizer, the constituents of said solvent mixture being present in proportion and quantity capable of effecting at least a partial solution of cellophane or like material and providing with the other ingredients a rapid-drying thick paste useful as a printing ink.

6. A quick-drying printing ink adapted for printing upon surfaces of cellophane or like material, comprising 7 to 10 parts by weight of cellulose nitrate; substantially 4 parts of copal resin; 6 to 9 parts of ester gum; about 16 parts of a non-volatile plasticizer for the cellulose nitrate, resin and gum; about 5 to 8 parts of magnesium carbonate as a bodying agent; soap; and pigment; in an organic solvent mixture for the cellulose nitrate, resin, gum and plasticizer; said solvent mixture including methyl alcohol, amyl acetate and butyl alcohol in the amount of about 58 parts by weight, and being present in proportion and quantity capable of effecting at least a partial solution of cellophane or like material and providing with the other ingredients a rapid-drying thick paste useful as a printing ink.

EDWARD M. DAVIDSON.